United States Patent [19]

Söderberg

[11] 4,037,143
[45] July 19, 1977

[54] MEANS IN A MOTOR-DRIVEN RAIL-VEHICLE

[75] Inventor: Bo Söderberg, Koping, Sweden

[73] Assignee: Asea Aktiebolag, Vasteras, Sweden

[21] Appl. No.: 541,041

[22] Filed: Jan. 14, 1975

[30] Foreign Application Priority Data

Sept. 6, 1974 Sweden .............................. 7411269

[51] Int. Cl.² .............................................. H02P 5/52
[52] U.S. Cl. ....................................... 318/52; 318/433
[58] Field of Search .................. 318/52, 318, 432, 433

[56] References Cited

U.S. PATENT DOCUMENTS

| | | | |
|---|---|---|---|
| 3,482,887 | 12/1969 | Sheppard | 318/52 UX |
| 3,541,406 | 11/1970 | Etienne | 318/52 |
| 3,657,601 | 4/1972 | Darrow | 318/52 UX |
| 3,743,900 | 7/1973 | Johansson | 318/52 |

Primary Examiner—B. Dobeck
Attorney, Agent, or Firm—Watson, Cole, Grindle & Watson

[57] ABSTRACT

A motor-driven rail-vehicle with a drive system including an electric motor and drive wheels is provided with an oscillation sensing member which senses oscillations within a pre-determined frequency range of an electrical quantity of the drive system, such as the armature current or voltage, and forms a signal representing such oscillations. This signal is compared with a signal corresponding to a predetermined threshold value, and the tractive force of the motor is reduced in response to an increase of the oscillation amplitude above such threshold value.

9 Claims, 2 Drawing Figures

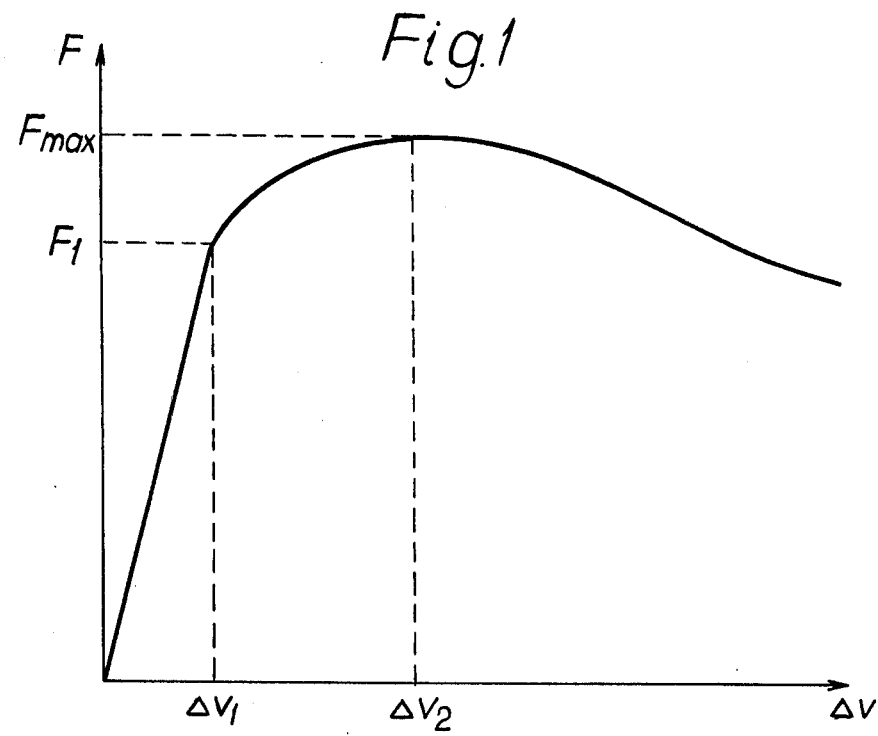
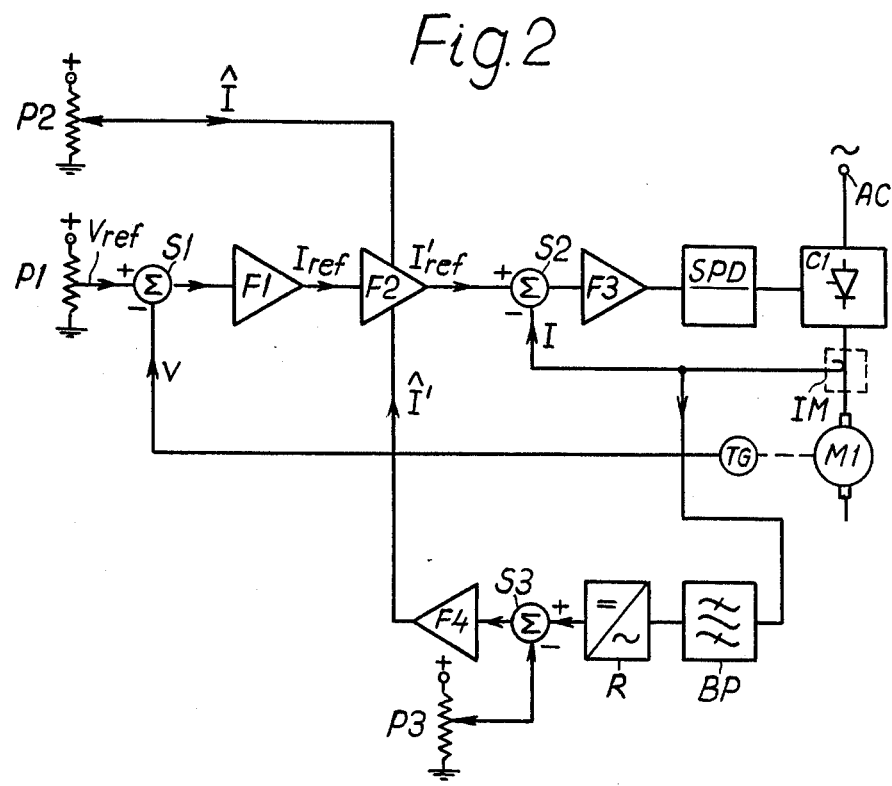

MEANS IN A MOTOR-DRIVEN RAIL-VEHICLE

BACKGROUND OF THE INVENTION

1. Field of the Invention

The present invention relates to a means of and method for controlling the tractive force in a motor-driven vehicle, such as a rail vehicle, comprising a drive wheel driven by a drive motor.

In a rail vehicle, the tractive force F varies with the difference $\Delta v$ between the peripheral speed of the drive wheel and the speed of the vehicle. To a relatively great extent, the tractive force varies depending on the surface of the rails and drive wheels, or the existence of contaminations, rust, ice or the like and the speed of the vehicle. In principle, when the tractive force increases from zero up to a certain value $F_1$, the difference $\Delta v$ between the peripheral speed of the drive wheel and the speed of the vehicle increases because of elastic deformations, relatively slowly up to a certain value $\Delta v_1$, which may be about 75 per cent of the maximum tractive force $F_{max}$. If the tractive forces increases further, pronounced slipping occurs between the wheels and the rail. The maximum tractive force $F_{max}$ is obtained normally when the difference is 1 or a few km/hour, and decreases if the difference $\Delta v$ increases further.

It is extremely desirable to be able to exploit the maximum available tractive force when necessary, that is, to be able to work in a stable manner with $\Delta v = \Delta v_2$, where of course $F = F_{max}$. Since, as mentioned above, both $\Delta v_2$ and $F_{max}$, vary relatively widely with uncontrollable external conditions, it has so far been impossible to fulfil this desire. The invention provides a system by which this problem is solved in a simple and advantageous manner.

2. The Prior Art

It has been found that in the case of slipping various kinds of oscillations in the drive system - bogie unit occur. In the arrangement described in Nilsson application Ser. No. 407,508, filed Oct. 18, 1973, primarily one of these modes of oscillations is used, namely torsional oscillations in the system drive axle - drive wheel, which oscillations in a typical case have a natural frequency of around 50 Hz. For detecting these oscillations, the above-mentioned application describes the use of a force transducer, for example of a magnetoelastic or a strain gauge type, attached to a reaction stay, or accelerometers arranged on the bogie. As an alternative it is of course possible to use a torque transducer or a speed transducer (tachometer-generator), mounted on the drive axle or the drive wheels, for detecting these oscillations.

SUMMARY OF THE INVENTION

The invention is based on the fact that the operating range $\Delta v \geq \Delta v_2$ is in principle unstable since the derivative of F with respect to $\Delta v$ is zero or negative. Because of this, mechanical oscillations occur within this range in the system composed of the drive wheel, the power transmission, the drive motor and the bogie. These oscillations have a natural frequency (possibly several) determined by the mechanical construction of the system. The existence of mechanical oscillations at such a natural frequency in the system thus constitutes an indication that the system is operating in the operating range $\Delta v \geq \Delta v_2$.

According to the invention, the fact is utilized that at least the oscillations of lower frequencies occurring in case of slipping in the drive system and the bogie propagate into the drive motor. The motor speed will thus have superimposed on it an alternating component which has a frequency corresponding to a natural frequency of the system which starts oscillating upon slipping. In a typical bogie, torsion-resilient elements are arranged between the drive motor and the drive wheel shaft. These elements prevent the motor from being affected by oscillations having higher frequencies. However, low-frequency oscillations may cause speed variations in the motor of such magnitudes that they may be used in practice for detecting slipping. These speed variations cause directly corresponding variations in the motor voltage and thus in the motor current.

In a typical bogie construction, an alternating component occurs in the voltage and current of the drive motor, said component having a frequency of the order of magnitude of 1 Hz. This component appears when the slipping exceeds the value at which maximum adhesion is obtained, and therefore it can be used to indicate that the adhesion maximum has been exceeded, and to control the tractive force so that the drive system works at the maximum point of the adhesion curve.

The drive motor itself is utilized as a transducer for the oscillations. The motor converts the speed variations into an electrical signal, namely the alternating component of the voltage and current of the motor. Any separate transducers are therefore not required. In drive equipment of this kind, motor voltage and current (or at least one of these) are generally available in the form of signals from measuring devices. Thus, the existing equipment needs to be complemented only to a minumum degree to realize the invention.

BRIEF DESCRIPTION OF THE DRAWINGS

The invention will be described further with reference to the accompanying FIGS. 1-2, where FIG. 1 shows the dependence of the tractive force on the relative speed between the wheels and the rail, and FIG. 2 shows the drive and control equipment for a drive motor M1 in a rail vehicle.

FIG. 1 shows how, in a rail-vehicle, the tractive force F varies with the difference $\Delta v$ between the peripheral speed of the drive wheel and the speed of the vehicle. To a relatively great extent, the appearance of the curve depends on the surface of the rails and drive wheels, the existence of contaminations, rust, ice, or the like, and the speed of the vehicle. In principle, however, when the tractive force increases from zero up to a certain value $F_1$ then $\Delta v$ increases, because of elastic deformations, relatively slowly up to a certain value $\Delta v_1$. In a typical case $F_1$ is about 75% of $F_{max}$. If the tractive force increases further, pronounced slipping occurs between the wheels and the rail. Maximum tractive force $F_{max}$ is obtained when $\Delta v = \Delta v_2$. $\Delta v_2$ is normally 1 or a few km/hour. If $\Delta v$ increases further, the tractive force decreases.

DESCRIPTION OF THE PREFERRED EMBODIMENTS

The armature of the motor is fed in a known manner by direct current from an alternating voltage network connected to the terminal AC over the controllable rectifier C 1. This emits a direct voltage the magnitude of which is determined by the signal delivered from the amplifier F 3 to the control pulse device SPD. The motor is provided with a tachometer-generator TG which delivers a signal proportional to the motor speed $v$. This signal is compared in the circuit S 1 with a speed reference $V_{ref}$ received from the potentiometer P 1. The speed error thus obtained is supplied to an amplifier F 1 with a suitable characteristic, the output signal of which constitutes the desired value $I_{ref}$ for the motor current. $I_{ref}$ is supplied to a limiting amplifier F 2. The output signal $I_{ref}'$ of said amplifier F 2 is proportional to the input signal $I_{ref}$ if $I_{ref}$ is smaller than or equal to a limit value $\hat{I}$ set with the help of the potentiometer P 2. For $I_{ref} > \hat{I}$, $I_{ref}'$ will be equal to $\hat{I}$. Thus, with the help of P 2 a maximum tractive force and thus acceleration can be set. A current measuring deivce IM generates a signal I proportional to the motor current, which signal is compared with $I_{ref}'$ in the circuit S 2. The difference $I_{ref}'$ minus I constitutes the current error and is supplied to the control pulse device SPD of the converter C 1 by way of the current regulator F 3. In a manner known per se, the control system now described will endeavor to maintain the speed constantly equal to the value $v_{ref}$ set on the potentiometer P 1, while observing that the maximum motor current (and thus the tractive force and the acceleration) set with the help of P 2 will not be exceeded.

The signal from the current measuring device IM is supplied to a band pass filter BP. This is adjusted so as to let through oscillations of a frequency which occurs in the drive system and the motor in case of slipping. As mentioned above, the frequency may be of the order of 1 Hz in a typical case. In a rectifier R the output signal from the band pass filter is converted to a direct voltage signal proportional to the oscillation amplitude, said direct voltage signal being supplied to a comparison device S 3. From the potentiometer P 3 a threshold signal is obtained. In S 3 the oscillation amplitude is compared with this threshold signal. The amplifier F 4 emits an output signal $\hat{I}'$ to the limiting amplifier F 2. This signal activates the amplifier F 2 in the same way as the signal I from the potentiometer P 2. During normal operation, that is, when the output signal from the rectifier R is less than the threshold value determined by P 3, the output signal $\hat{I}'$ from F 4 is so great that it does not give rise to any limitation of the output signal of the amplifier F 2. If the oscillation amplitude exceeds the threshold value determined by P 3, the output signal $\hat{I}'$ from F 4 is reduced, the current reference $I_{ref}'$ thus being limited. The armature current I of the motor and accordingly the tractive force are then correspondingly reduced, which causes the oscillation amplitude to be reduced. In this way a closed control circuit is produced which, when high acceleration is desired, automatically ensures that the drive system operates at the point where the adhesion is at its maximum. In this way the maximum adhesion available will be exploited to the full under all conditions.

The threshold value with which the oscillation amplitude is compared in S 3 may be zero, and in that case P 3 and S 3 can be omitted. However, it is advisable with the help of P 3 to select a threshold value such that unjustified reductions of the tractive force caused by minor oscillations are avoided. Similarly, it may be advisable in some cases to introduce a certain smoothing or delay in the signal path R - S 3 - F 4 - F 2, so that brief oscillations are prevented from reducing the tractive force.

Alternatively, a measuring device can be arranged to produce a signal corresponding to the instantaneous value of the motor voltage, said signal being supplied to the band pass filter BP. As a measuring device it is possible to use, for example, a voltage divider.

On the same bogie there are in most cases two (possibly more) drive axles with one motor each. Each motor can be provided with its own feeding and control system, identical with the one shown in the drawings.

In some cases the motors in the same bogie or possibly all motors in a vehicle are fed from a common converter. Each motor is then suitably provided with a current and voltage measuring device, a band pass filter BP and a rectifier R. A selection circuit can then be arranged to forward to S 3 the largest of the signals received from the rectifiers R.

The reduction in tractive force dependent on the oscillation amplitude can of course be obtained in a great many ways other than that described above in connection with FIG. 2. For example, $\hat{I}'$ may instead be supplied to the comparison circuit S 2 and there subtracted from the current reference $I_{ref}'$.

In a simplified embodiment of the invention, the output signal from the oscillation-sensing member is supplied to an indicator in the driver's cabin of the vehicle. When oscillations occur, therefore, the driver must adjust the tractive force manually. Even with this simplified system, considerable improvements in tractive force can be achieved.

The system according to the invention has been described above in connection with slipping which occurs during acceleration. Naturally, however, it provides the same advantageous effect in case of skidding which occurs as a result of electrical braking by means of the motors.

The typical natural oscillation frequencies mentioned above are of course only examples, and they vary between different bogie constructions.

The term "indicator" as used herein means any device responsive to a signal, whether it be an instrument or a control means of any sort.

I claim:

1. In a motor-driven vehicle having at least one drive system which comprises an electric drive motor and drive wheels, an oscillation sensing member which includes means to sense oscillations of an electrical quantity within the frequency range of natural oscillation of the drive system and to form a signal corresponding to the amplitude of said oscillations, means for controlling the torque of said electrical drive motor in response to said signal; and said control means including means to partially reduce the torque of said electric drive motor in response to oscillations within such natural frequency range.

2. Means according to claim 1, including means to sense oscillations within said frequency range of natural oscillation of the armature current of the drive motor.

3. Means according to claim 1, including means to sense oscillations within said frequency range of natural oscillation of the armature voltage of the drive motor.

4. Means according to claim 1, comprising means for comparing the oscillation amplitude with a predetermined threshold value, said control means being responsive to reduce the tractive force of the motor in response to an increase of the oscillation amplitude above said threshold value.

5. A method for controlling the tractive force in a motor-driven vehicle, said vehicle having at least one drive system with an electric drive motor and drive wheels, said method comprising the steps of sensing oscillations of an electrical quantity within the frequency range of natural oscillation of the drive system, forming a signal corresponding to the amplitude of said oscillations and controlling the tractive force of the drive motor in response to said signal.

6. A method according to claim 5, comprising a step of comparing the oscillation amplitude with a predetermined threshold value.

7. A method according to claim 6, comprising the step of reducing the tractive force of the drive motor in response to an increase of the oscillation amplitude above said threshold value.

8. A method according to claim 5, comprising the step of sensing oscillations within said frequency range of the armature current of the drive motor.

9. A method according to claim 5, comprising the step of sensing oscillations within said frequency range of the armature voltage of the drive motor.

* * * * *